Sept. 12, 1933.  E. J. STEIN  1,926,704
CUTTING TABLE
Filed Feb. 18, 1931
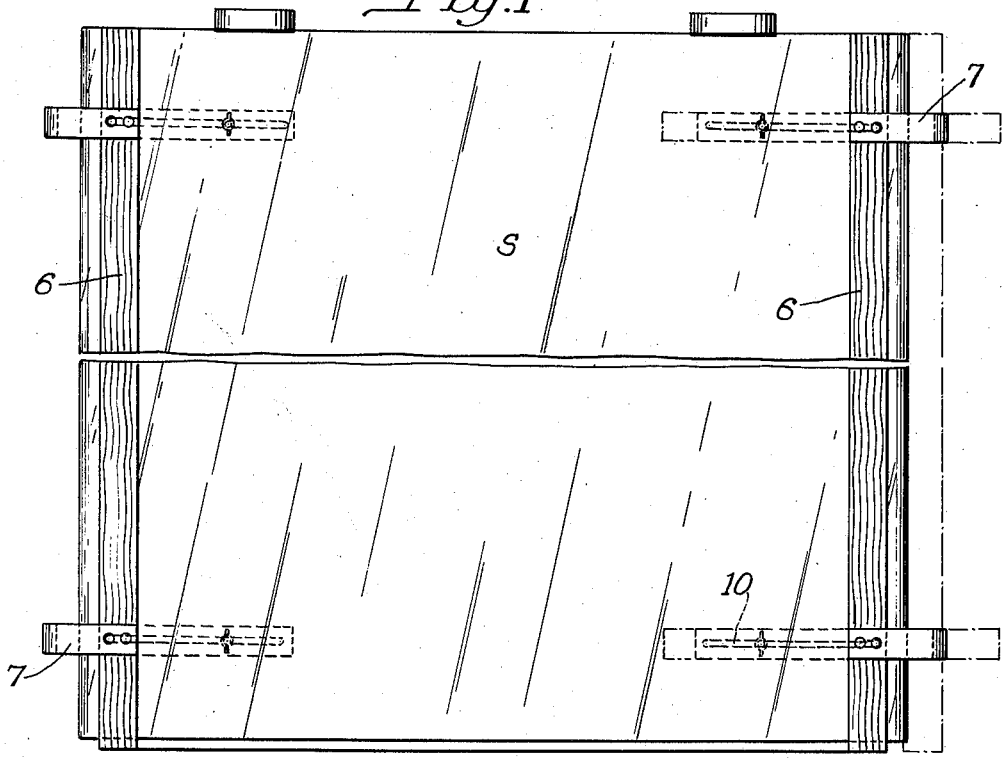
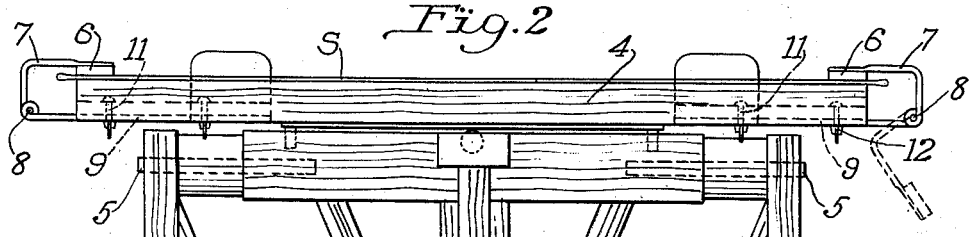
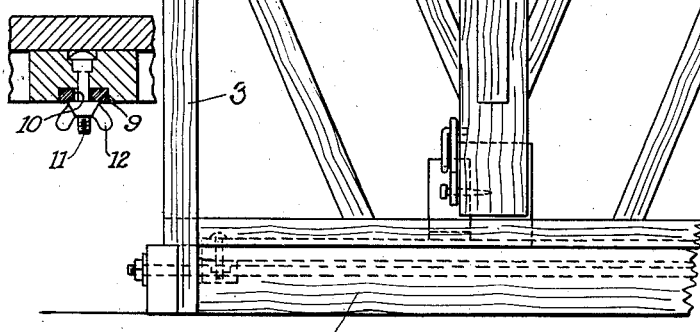
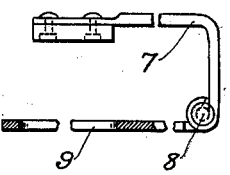
INVENTOR
Edward J. Stein
By Byrnes, Stebbins,
Parmelee & Blenko
Attorneys Patented Sept. 12, 1933

1,926,704

UNITED STATES PATENT OFFICE 1,926,704

CUTTING TABLE

Edward J. Stein, Belle Vernon, Pa., assignor to American Window Glass Company, Pittsburgh, Pa., a corporation of Pennsylvania Application February 18, 1931. Serial No. 516,701

3 Claims. (Cl. 33—32)

My invention relates generally to cutting tables used in the cutting of sheet glass, and more particularly to new and useful cutting guides therefor.

In the drawing of sheet glass, a bulb or enlarged portion is formed on each edge of the drawn sheet of glass. The drawn sheet is transported to and placed on a suitable cutting table for the purpose of removing the bulb or enlarged edges. By my invention, I provide a table adapted to support a glass sheet during the cutting thereof, which has attached thereto suitable cutting guides. The guides which I provide are adapted to be readily swung into position on the sheet of glass to be cut on the table, and to be readily swung out of cutting position when it is desired to remove the sheet from the table, or to place a new sheet thereon. This facilitates the placing of the sheets of glass on the cutting table and their removal therefrom, as the guides may be swung clear of the top of the table. By the provision of cutting guides of the character hereinafter more fully described, sheets of uniform width may be formed, and waste very materially reduced.

By my invention, I further provide means whereby the guides, or one of them, may be adjusted along the top of the table so as to permit the cutting of sheets of various sizes.

In the accompanying drawing, I have shown, for purposes of illustration only, a preferred embodiment of my invention. In the drawing, Figure 1 is a plan view of the table and cutting guides which I provide;

Figure 2 is an end elevational view of the table and guides shown in Figure 1;

Figure 3 is a partial sectional view showing the manner in which the guides are slidably mounted on the table; and Figure 4 is an elevational view partly in section of one of the guides.

The general features of the table shown in the drawing are more clearly shown and described in my Patent No. 1,921,489 granted Aug. 8, 1933. The table, in general, comprises a base 2, a supporting structure indicated generally by the reference character 3, and a top 4, which is adapted to support a sheet of glass S. The top 4 of the table, as is clearly shown in my copending application above referred to, is revolvable on pivot pins 5 to a glass receiving or discharging position at a substantial angle to the normal horizontal position.

The guides which I provide comprise a guide strip 6, which has angular arms 7 attached thereto. The guide strip 6 may be of wood or any other suitable material. Each angular arm 7 is pivotally mounted as at 8 to a flat member 9 which is mounted on the bottom of the top of the table. The member 9 is provided with a slot 10 by which it is attached to the bottom of the table top by means of screws 11 and wing nuts 12. By attaching the member 9 to the table in the manner just described, it is adjustable along the table. Consequently, by adjusting the member 9, the guide strip 6 may be moved along the top of the table. This makes it possible to accurately cut sheets of any desired size and to have them of a uniform size.

Each arm 7, as stated above, is pivotally mounted on a member 9 at 8. By virtue of said arms being pivotally mounted, they may be swung clear of the top of the table when it is desired to place a sheet of glass thereon or to remove one therefrom. This is a very desirable feature, as it facilitates the handling of the glass and permits the cutting of sheets of uniform width, with the consequent reduction of waste.

While I have shown and described a preferred embodiment of my invention, it is to be understood that it is not to be limited thereby, but may be otherwise embodied or practiced within the scope of the following claims.

I claim:

1. The combination with a table having a top adapted to support a sheet of glass during cutting thereof, of a cutting guide strip extending longitudinally of the table, a plurality of arms rigidly attached thereto, and a plurality of horizontally extending members slidably mounted on the bottom of the table top, on each of which one of said arms is pivotally mounted below the top surface of the table top, said members being slidable transversely of the table top.

2. The combination with a table having a top adapted to support a sheet of glass during cutting thereof, of a cutting guide strip extending longitudinally of the table, a plurality of arms rigidly attached thereto, and a plurality of horizontally extending members slidably mounted on the bottom of the table top, on each of which one of said arms is pivotally mounted below the top surface of the table top, said members being slidable transversely of the table top, and said cutting guide being fixed against movement longitudinally of the table top.

3. The combination with a table having a top adapted to support a sheet of glass during cutting thereof, of a cutting guide strip extending longitudinally of the table, a plurality of arms rigidly attached thereto, and a plurality of horizontally extending members slidably mounted on the bottom of the table top, on each of which one of said arms is pivotally mounted below the top surface of the table top, whereby said guide may be swung from a position on the table top to a position therebelow, said members being slidable transversely of the table top only.

EDWARD J. STEIN.